(12) United States Patent
Granström et al.

(10) Patent No.: US 8,976,221 B2
(45) Date of Patent: Mar. 10, 2015

(54) ADAPTABLE IDENTIFICATION OF RELEVANT REGIONS IN LIVE STREAMS

(71) Applicant: Google Inc., Mountain View, CA (US)

(72) Inventors: Johan Georg Granström, Zurich (CH); Stephane Zermatten, Zurich (CH); Tristan Schmelcher, Seattle, WA (US); Gang Ji, Bothell, WA (US)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 13/692,966

(22) Filed: Dec. 3, 2012

(65) Prior Publication Data

US 2014/0152760 A1    Jun. 5, 2014

(51) Int. Cl.
| | | |
|---|---|---|
| *H04N 7/14* | (2006.01) | |
| *G06K 9/00* | (2006.01) | |
| *G11B 27/00* | (2006.01) | |
| *G06F 17/30* | (2006.01) | |
| *H04N 21/2187* | (2011.01) | |
| *H04N 21/234* | (2011.01) | |
| *H04N 21/2343* | (2011.01) | |
| *H04N 21/254* | (2011.01) | |
| *H04N 21/2665* | (2011.01) | |
| *H04N 21/27* | (2011.01) | |
| *H04N 21/454* | (2011.01) | |
| *H04N 21/4545* | (2011.01) | |
| *H04N 21/4788* | (2011.01) | |
| *H04N 21/84* | (2011.01) | |

(52) U.S. Cl.
CPC *G06K 9/00* (2013.01); *G11B 27/00* (2013.01); *G06F 17/30781* (2013.01); *H04N 21/2187* (2013.01); *H04N 21/23418* (2013.01); *H04N 21/234345* (2013.01); *H04N 21/2541* (2013.01); *H04N 21/2665* (2013.01); *H04N 21/27* (2013.01); *H04N 21/4542* (2013.01); *H04N 21/45455* (2013.01); *H04N 21/4788* (2013.01); *H04N 21/84* (2013.01)
USPC ............... 348/14.08; 348/14.01; 348/14.12

(58) Field of Classification Search
CPC ......... H04N 7/14; H04N 7/141; H04N 7/142; H04N 7/144; H04N 7/147; H04N 7/148; H04N 7/15; H04N 7/152; G06T 1/0021
USPC ........................................ 348/14.01–14.16
See application file for complete search history.

(56) References Cited

U.S. PATENT DOCUMENTS

| | | | | |
|---|---|---|---|---|
| 8,125,508 | B2 * | 2/2012 | Kenoyer ............... | 348/14.08 |
| 8,611,422 | B1 * | 12/2013 | Yagnik et al. ......... | 375/240.16 |
| 2011/0090301 | A1 * | 4/2011 | Aaron et al. ........... | 348/14.08 |
| 2012/0249877 | A1 * | 10/2012 | Hernandez Costa et al. . | 348/564 |

* cited by examiner

*Primary Examiner* — Melur Ramakrishnaiah
(74) *Attorney, Agent, or Firm* — Lowenstein Sandler LLP (57) ABSTRACT

Systems and methods are disclosed for detecting when a video stream embedded within a region of another video stream contains copyrighted material. In one implementation, a computer system receives a first video stream and determines that the first video stream comprises a second video stream within a region of the first video stream, using metadata that identifies a set of geometric properties of the region. The computer system obtains the second video stream from the first video stream based on the set of geometric properties of the region, and determines whether the second video stream contains copyrighted material.

26 Claims, 6 Drawing Sheets

ADAPTABLE IDENTIFICATION OF RELEVANT REGIONS IN LIVE STREAMS

TECHNICAL FIELD

Aspects and implementations of the present disclosure relate to data processing, and more specifically, to identifying relevant regions in live video streams.

BACKGROUND

Video collaborations over the Internet (e.g., video conferences, telemedicine, etc.) are becoming increasingly common as broadband access and applications that take advantage of broadband connectivity proliferate. Applications for supporting video collaborations may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a computer system identifies a first video stream that comprises a second video stream within a region of the first video stream, and metadata identifying a set of geometric properties of the region. The computer system obtains the second video stream from the first video stream based on the metadata, and determines whether the second video stream contains copyrighted material.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to detecting when a video stream embedded within a region of another video stream contains copyrighted material. The systems and methods disclosed can be applied to video collaborations (e.g., video conferences, etc.) in which video streams (e.g., live video footage captured via a Web video camera, recorded video footage of an event, movie clips, etc.) that are transmitted by one or more participants are combined into a composite video stream having the individual video streams depicted inside regions of the composite video stream. More particularly, the issue of copyright infringement may occur in such video collaborations when a participant transmits copyrighted material (e.g., a clip from a movie, a clip from a baseball game, etc.) which can then be viewed by other participants. As video collaborations may potentially involve large numbers of participants throughout the world (particularly passive participants [or "lurkers"] who view the video streams of active participants), the broadcasting of copyrighted material can be problematic.

Figure 1:
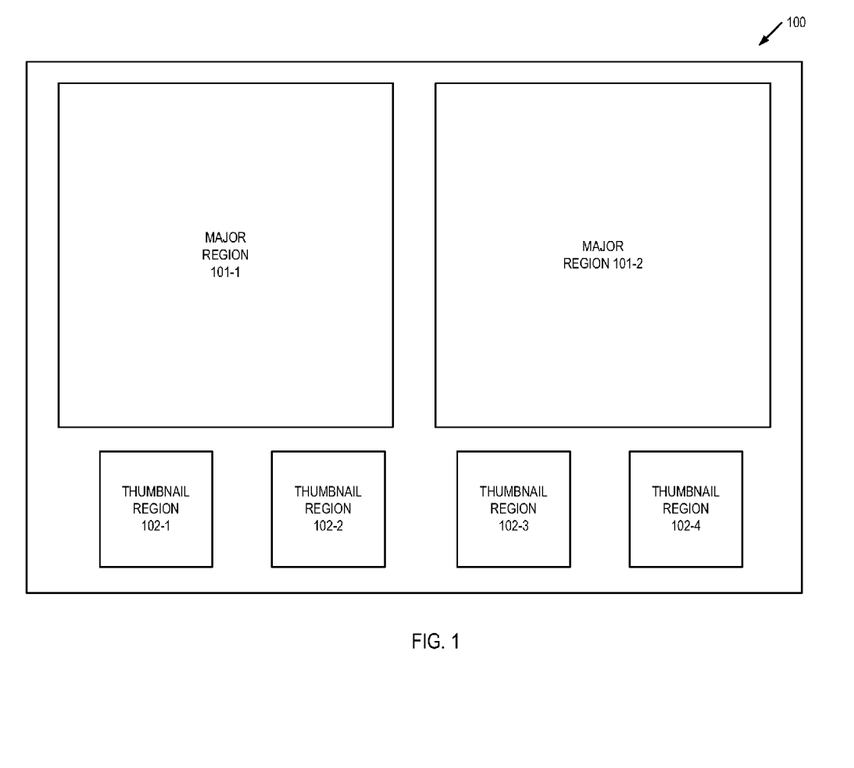
FIG. 1 depicts an illustrative screen of a composite video stream associated with a video collaboration, in accordance with one implementation of the present disclosure.

FIG. 1 depicts an illustrative screen 100 of a composite video stream associated with a video collaboration, in accordance with one implementation of the present disclosure. As shown in FIG. 1, screen 100 comprises two major regions 101-1 and 101-2 and four thumbnail regions 102-1 through 102-4, where each of the regions is associated with a respective participant. The major regions 101-1 and 101-2 contain video streams transmitted by a first participant and a second participant, respectively (e.g., "rooms" of the first and second participants in a video conference, video clips shared by the first and second participants, etc.), while each of the thumbnail regions may contain a miniaturized version of a video stream transmitted by a participant, or simply a static image (e.g., an avatar, etc.) associated with the participant or video stream. In one implementation, a thumbnail region may transform into a major region (e.g., in response to a participant clicking on the thumbnail region, in response to an action performed by the participant associated with the thumbnail region), and vice versa. It should be noted that although the regions of screen 100 are depicted as rectangular, one or more of the regions may have some other shape (e.g., a circle, a trapezoid, etc.).

In accordance with one implementation, a first server machine combines the individual video streams into a composite video stream and embeds within the composite video stream metadata that specifies geometric properties of the regions corresponding to the video streams as well as a region/participant mapping (an association between a participant and a region). The first server machine then transmits the composite video stream to a second server machine that identifies the region from the metadata and analyzes the video streams embedded within the regions to determine whether a participant is broadcasting copyrighted material. In one implementation, this is determined by generating fingerprints based on the embedded video stream and matching the fingerprints against a repository that associates copyrighted video segments with fingerprints for the segments. When it is determined that a particular video stream is in fact copyrighted, an action is performed such as removing the region from the composite video stream, transmitting a warning to the participant broadcasting the copyrighted material, removing the participant from the video collaboration, replacing the video stream with other content, terminating the video collaboration, and so forth.

Aspects and implementations of the present disclosure are thus capable of detecting and blocking the broadcasting of copyrighted material by participants in a video collaboration. In addition, while aspects and implementations of the present disclosure are disclosed in the context of video collaborations, the techniques disclosed are applicable to any application in which a video stream is embedded within a region of another video stream.

Figure 2:
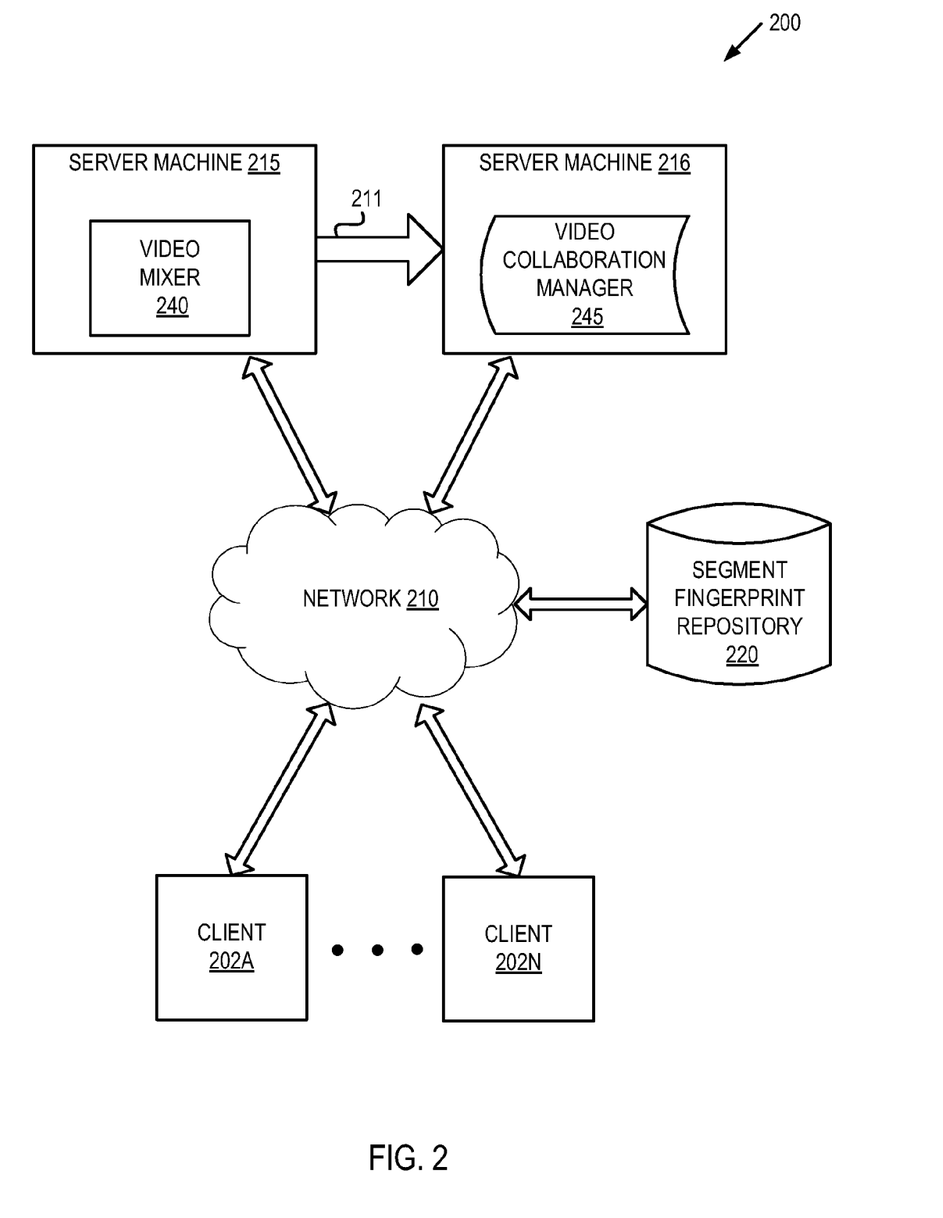
FIG. 2 depicts an illustrative system architecture, in accordance with one implementation of the present disclosure.

FIG. 2 depicts an illustrative system architecture 200, in accordance with one implementation of the present disclosure. The system architecture 200 includes a server machine 215, a server machine 216, a segment fingerprint repository 220, and client machines 202A-202N connected to a network 210. Network 210 may be a public network (e.g., the Internet), a private network (e.g., a local area network (LAN) or wide area network (WAN)), or a combination thereof.

The client machines 202A-202N may be wireless terminals (e.g., smartphones, etc.), personal computers (PC), laptops, tablet computers, or any other computing or communication devices. The client machines 202A-202N may run an operating system (OS) that manages hardware and software of the client machines 202A-202N. A browser (not shown) may run on the client machines (e.g., on the OS of the client machines). The browser may be a web browser that can render pages of a server-side web video collaboration application, or that can run browser-based applications (e.g., a Java-based video collaboration applet launched via a website, etc.). The client machines 202A-202N may run video collaboration applications that are not browser-based, and may transmit video streams (e.g., live video footage via a Web video camera, recorded video footage of an event, movie clips, etc.) to server machine 215 for processing and distribution to other client machines involved in a video collaboration (e.g., active participants who also transmit video streams, passive participants [or "lurkers"] who view the video streams of active participants but do not transmit their own video streams, etc.). The client machines 202A-202N may be geographically distributed anywhere throughout the world.

Segment fingerprint repository 220 is a persistent storage that stores fingerprints (e.g., quantitative data derived from features such as color, intensity, etc.) of copyrighted video segments, as well as data structures to associate the copyrighted video segments with their respective fingerprints (e.g., a table in which each row stores an identifier of a video segment and fingerprint data for that video segment, etc.). Segment fingerprint repository 220 may be hosted by one or more storage devices, such as main memory, magnetic or optical storage based disks, tapes or hard drives, NAS, SAN, and so forth. In some implementations, segment fingerprint repository 220 may be a network-attached file server, while in other implementations segment fingerprint repository 220 may be some other type of persistent storage such as an object-oriented database, a relational database, and so forth, that may be hosted by the server machine 216 or one or more different machines coupled to the server machine 216 via the network 210, while in yet other implementations segment fingerprint repository 220 may be a database that is hosted by another entity (e.g., a movie studio, etc.) and made accessible to server machine 216.

Server machine 215 may be a rackmount server, a router computer, a personal computer, a portable digital assistant, a mobile phone, a laptop computer, a tablet computer, a camera, a video camera, a netbook, a desktop computer, a media center, or any combination of the above. Server machine 215 includes a video mixer 240 that combines individual video streams of participants into a composite video stream (e.g., as depicted in FIG. 1, etc.), embeds metadata into the composite video stream comprising geometric properties of the regions (e.g., region coordinates, region dimensions, etc.) associated with participants' video stream and transmits the composite video stream to server machine 216 via a broadband pipeline 211. Some operations of video mixer 240 are described in more detail below with respect to FIG. 4. It should be noted that in some implementations in which video collaborations are supported by a browser-based application, server machine 215 may also include a web server that hosts a website through which users can join and view video collaborations.

Server machine 216 may be a rackmount server, a router computer, a personal computer, a portable digital assistant, a mobile phone, a laptop computer, a tablet computer, a camera, a video camera, a netbook, a desktop computer, a media center, or any combination of the above. Server machine 216 includes a video collaboration manager 245 that receives a composite video stream associated with a video collaboration, determines whether any regions of the composite video stream contain copyrighted material, performs one or more actions when one or more regions contain copyrighted material (e.g., transmitting a warning to a participant broadcasting the copyrighted material, removing the offending video stream from the composite video stream, etc.), and then distributes the composite video stream to participants of the video collaboration (provided the actions do not include terminating the entire video collaboration). It should be noted that in some implementations, server machine 216 may distribute the composite video stream to participants of the video collaboration via server machine 215 (e.g., via web server hosted by server machine 215, etc.), rather than directly. An implementation of video collaboration manager 245 is described in detail below with respect to FIG. 3, and some operations of video collaboration manager 245 are described in detail below with respect to FIG. 5.

It should be noted that in some alternative implementations, server machine 215 may transmit composite video streams to server machine 216 via network 210, or via some other conduit (e.g., a local area network not depicted in FIG. 2, etc.), instead of via a dedicated broadband pipeline 211. Similarly, in some alternative implementations server machines 215 and 216 may be combined into a single server machine, while in some other implementations, server machines 215 and 216 may be replicated and distributed over a plurality of geographical regions (e.g., a first instance of server machines 215 and 216 at a first location, a second instance of server machines 215 and 216 at a second location, etc.).

Figure 3:
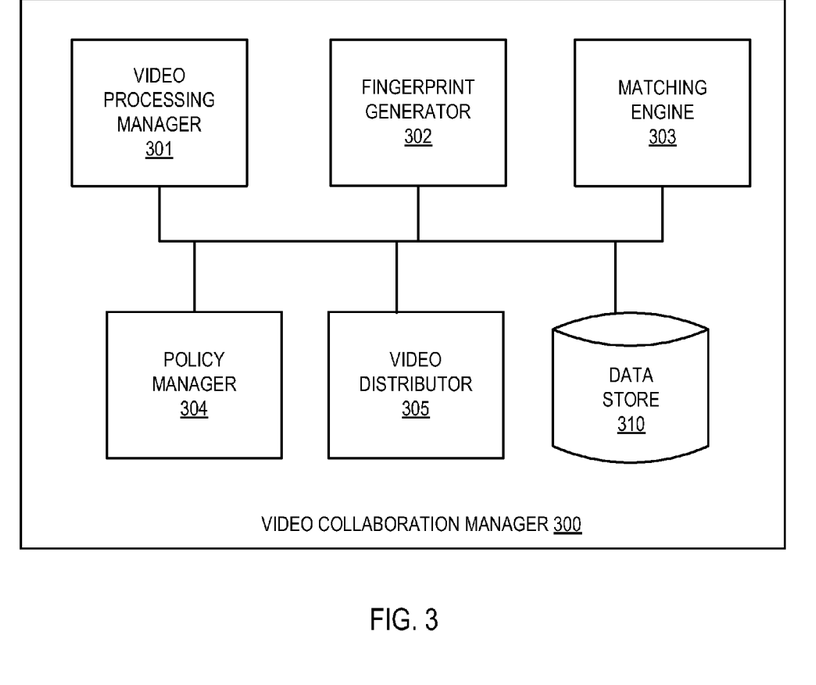
FIG. 3 depicts a block diagram of one implementation of a video collaboration manager.

FIG. 3 depicts a block diagram of one implementation of a video collaboration manager 300. The video collaboration manager 300 may be the same as the video collaboration manager 225 of FIG. 2 and may include a video processing manager 301, a fingerprint generator 302, a matching engine 303, a policy manager 304, a video distributor 305, and a data store 310. The components can be combined together or separated in further components, according to a particular implementation. It should be noted that in some implementations, various components of video collaboration manager 300 may run on separate machines.

The data store 310 may be the same as segment fingerprint repository 220 or a different data store (e.g., a temporary buffer or a permanent data store) to hold one or more fingerprints of copyrighted video streams to be stored in segment fingerprint repository 220, one or more fingerprints of current video streams that are to be matched against segment fingerprint repository 220, one or more data structures for indexing the fingerprint-segment associations in segment fingerprint repository 220, one or more images or video stream segments that are to be processed, image data (e.g., coordinates of regions, dimensions of regions, pixel values, etc.), or some combination of these data. Data store 310 may be hosted by one or more storage devices, such as main memory, magnetic or optical storage based disks, tapes or hard drives, and so forth.

The video processing manager 301 decodes and filters composite video streams, identifies from embedded metadata the regions of a composite video stream containing participants' individual video streams, and crops/re-sizes participants' individual video streams as appropriate to facilitate matching against repository 220. Some operations of video processing manager 301 are described in more detail below with respect to FIG. 5.

The fingerprint generator 302 generates one or more fingerprints of a segment of a participant's video stream by first obtaining a feature vector for using one or more techniques such as principal components analysis, semidefinite embeddings, Isomaps, partial least squares, etc., and then deriving one or more fingerprints from the feature vector (e.g., a hash of the feature vector, an encoding of the feature vector, etc.). Some operations of fingerprint generator 302 are described in more detail below with respect to FIG. 5.

The matching engine 303 matches fingerprints generated for one or more segments of a participant's video stream against segment/fingerprint repository 220. In one aspect, matching engine 303 employs a set of rules for matching fingerprints against the repository, while in another aspect, matching engine 303 compares fingerprints against a data structure (e.g., a hash table, etc.) that indexes the repository fingerprints. In yet other aspects, matching engine 303 employs one or more classifiers (e.g., a support vector machine [SVM], AdaBoost, a neural network, a decision tree, etc.) that are trained based on positive examples (e.g., video segments that are known to be copyrighted) and negative examples (e.g., video segments that are known not to be copyrighted), that accept the generated fingerprints (or a feature vector from which the fingerprints were derived) as input, and that output a score (e.g., a number between 0 and 1 inclusive, etc.) indicating the likelihood that the participant's video stream contains copyrighted material, while in still other aspects, matching engine 303 may employ a combination of these techniques.

In one aspect, matching engine 303 identifies a set of copyrighted video segments in repository 220 that match the participant's video stream, while in some other aspects, matching engine 303 may determine that a participant's video stream contains copyrighted material without identifying particular copyrighted segments that match the participant's video stream. Some operations of matching engine 303 are described in detail below with respect to FIG. 5.

The policy manager 304 determines (e.g., based on predefined policies) one or more actions to perform in response to identifying a set of copyrighted segments that match a participant's video stream. These actions may include removing a participant's video stream from a composite video stream, replacing a participant's video stream in the composite video stream with alternative content (e.g., a static image containing a message that indicates that copyrighted material is being blocked, a blank image, a different video stream that does not contain copyrighted material), terminating the entire video collaboration, and so forth. In one aspect, which actions are taken may depend on the set of matching copyrighted segments (e.g., the type of content in the segments, the authors/publishers of the copyrighted segments, the number of matching segments, etc.). Some operations of policy manager 304 are described in detail below with respect to FIG. 5.

The video distributor 305 processes the composite video stream in accordance with one or more actions specified by policy manager 304 (e.g., removing a certain video stream from the composite video stream, blanking out a certain video stream, etc.) and distributes the processed composite video stream to participants of the video collaboration (provided none of the actions are to terminate the video collaboration).

Figure 4:
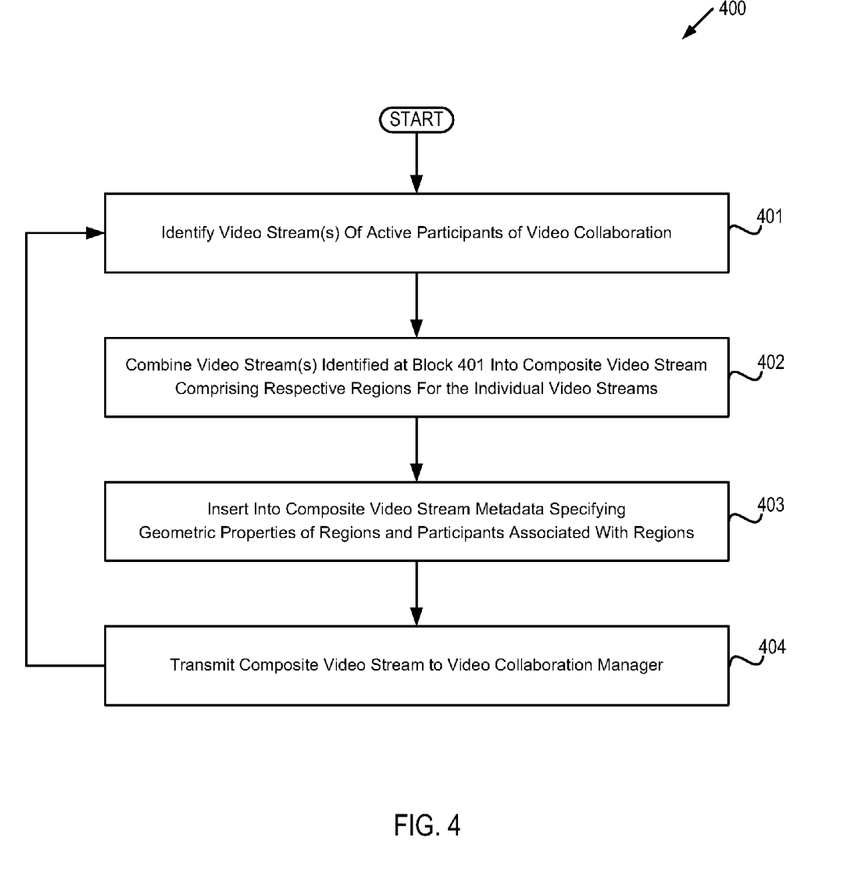
FIG. 4 depicts a flow diagram of aspects of a method for combining video streams of participants of a video collaboration into a composite video stream.

FIG. 4 depicts a flow diagram of aspects of a method 400 for combining video streams of participants of a video collaboration into a composite video stream. The method is performed by processing logic that may comprise hardware (circuitry, dedicated logic, etc.), software (such as is run on a general purpose computer system or a dedicated machine), or a combination of both. In one implementation, the method is performed by the server machine 215 of FIG. 2, while in some other implementations, one or more blocks of FIG. 4 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 401, video stream(s) of active participant(s) of a video collaboration are identified, and at block 402, the identified video stream(s) are combined into a composite video stream that comprises respective regions for the video stream(s) (e.g., a first region for a first active participant, a second region for a second active participant). It should be noted that in some aspects, all of the regions may be major regions, while in some other aspects, one or more of the regions may be thumbnail regions (e.g., there may be only one major region at any given time, etc.). In accordance with one aspect, blocks 401 and 402 are performed by video mixer 240 of server machine 215.

At block 403, metadata is inserted into the composite video stream, where the metadata specifies one or more geometric properties for each region (e.g., coordinates of a region [such as coordinates of the upper left and lower right corners of a rectangular region], dimensions of a region [such as the height and width of a rectangular region], etc.) and identifies the participant associated with each region (thereby enabling system 200 to send a warning message to a participant broadcasting copyrighted material, remove the participant from the collaboration session, revoke broadcasting privileges, etc.). It should be noted that the inclusion of block 403 within the loop of FIG. 4 ensures that the metadata is up-to-date and properly captures participants joining and leaving a video collaboration, changes in region geometry, and so forth. In accordance with one aspect, block 403 is performed by video mixer 240.

At block 404, the composite video stream is transmitted to video collaboration manager 245 of server machine 216. After block 404, execution continues back at block 401. It should be noted that the inclusion of block 401 in the loop enables the method to handle dynamic video collaborations in which participants join and leave a video collaboration while the collaboration is in progress.

Figure 5:
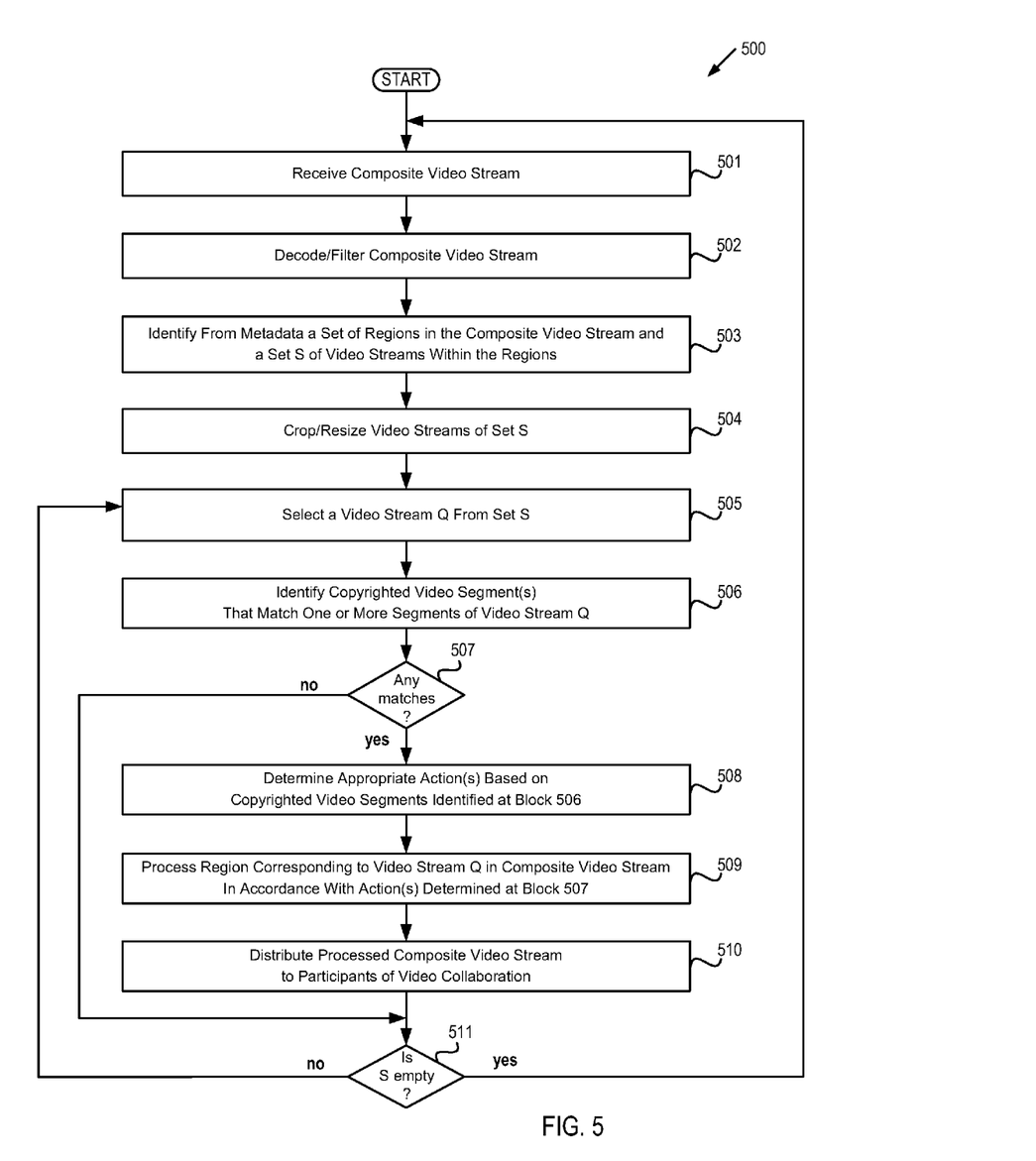
FIG. 5 depicts a flow diagram of aspects of a method for processing and distributing a composite video stream that may include copyrighted material.

FIG. 5 depicts a flow diagram of aspects of a method for processing and distributing a composite video stream that may include copyrighted material. The method is performed by processing logic that may comprise hardware (circuitry, dedicated logic, etc.), software (such as is run on a general purpose computer system or a dedicated machine), or a combination of both. In one implementation, the method is performed by the server machine 216 of FIG. 2, while in some other implementations, one or more blocks of FIG. 5 may be performed by another machine.

At block 501, a composite video stream is received. In accordance with one aspect, block 501 is performed by video collaboration manager 245 of server machine 216.

At block 502, the composite video stream is decoded and filtered, and at block 503, metadata embedded in the composite video stream is analyzed to identify a set of regions in the composite video stream and a set S of individual video streams within the regions. In accordance with one aspect, blocks 502 and 503 are performed by video processing manager 301.

It should be noted that in one aspect, the set of identified regions may include only major regions, and no thumbnail regions, in which case set S consists only of video streams of major regions. Alternatively, in some other aspects, the set of identified regions may include all of the regions, both major and thumbnail, while in yet other aspects, the set of regions may be compared to a minimum threshold size that may exclude small major regions (say, below 100×100 pixels) as well as thumbnail regions.

At block 504, each of the video streams of set S is cropped and re-sized as necessary to facilitate matching of the video streams against copyrighted video segments. In accordance with one aspect, block 504 is performed by video processing manager 301.

At block 505, a video stream Q is selected from set S. At block 506, copyrighted video segment(s) matching one or more segments of video stream Q are identified. In accordance with one aspect, fingerprint generator 302 generates fingerprint(s) based on the one or more segments and matching engine 303 identifies the copyrighted video segment(s) matching the one or more segments. As described above, in one aspect matching engine 303 employs a set of rules for matching fingerprints against repository 220, while in another aspect, matching engine 303 compares fingerprints against a data structure (e.g., a hash table, etc.) in repository 220 that indexes the fingerprints of copyrighted video segments, while in yet other aspects, matching engine 303 employs one or more classifiers that output a score indicating the likelihood that video stream Q contains copyrighted material, while in still other aspects, matching engine 303 may employ a combination of these techniques.

Block 507 branches based on whether any matching copyrighted video segments were identified at block 506. If not, execution continues at block 511, otherwise execution proceeds to block 508.

At block 508, one or more actions are determined based on the copyrighted video segments identified at block 506. In one aspect, the actions may include transmitting a warning to the participant who is broadcasting video stream Q, removing video stream Q from the composite video stream, replacing video stream Q with a static image, replacing video stream Q with a different video stream that is not copyrighted, terminating the video collaboration, and so forth. In one aspect, which action(s) are taken may depend on the matching copyrighted segments (e.g., the type of content in the segments, the authors/publishers of the copyrighted segments, the number of matching segments, etc.). In one aspect, block 508 is performed by policy manager 304.

At block 509, the region corresponding to video stream Q in the composite video stream is processed in accordance with the action(s) determined at block 507, and at block 510, the processed composite video stream is distributed to participants of the video collaboration (provided that the actions determined at block 507 does not include terminating the video collaboration). In one aspect, block 509 is performed by video distributor 305.

Block 511 checks whether set S is empty (i.e., whether all of the video streams within regions of the composite video stream have been analyzed and processed). If not, execution continues back at block 505, otherwise execution continues back at block 501.

Figure 6:
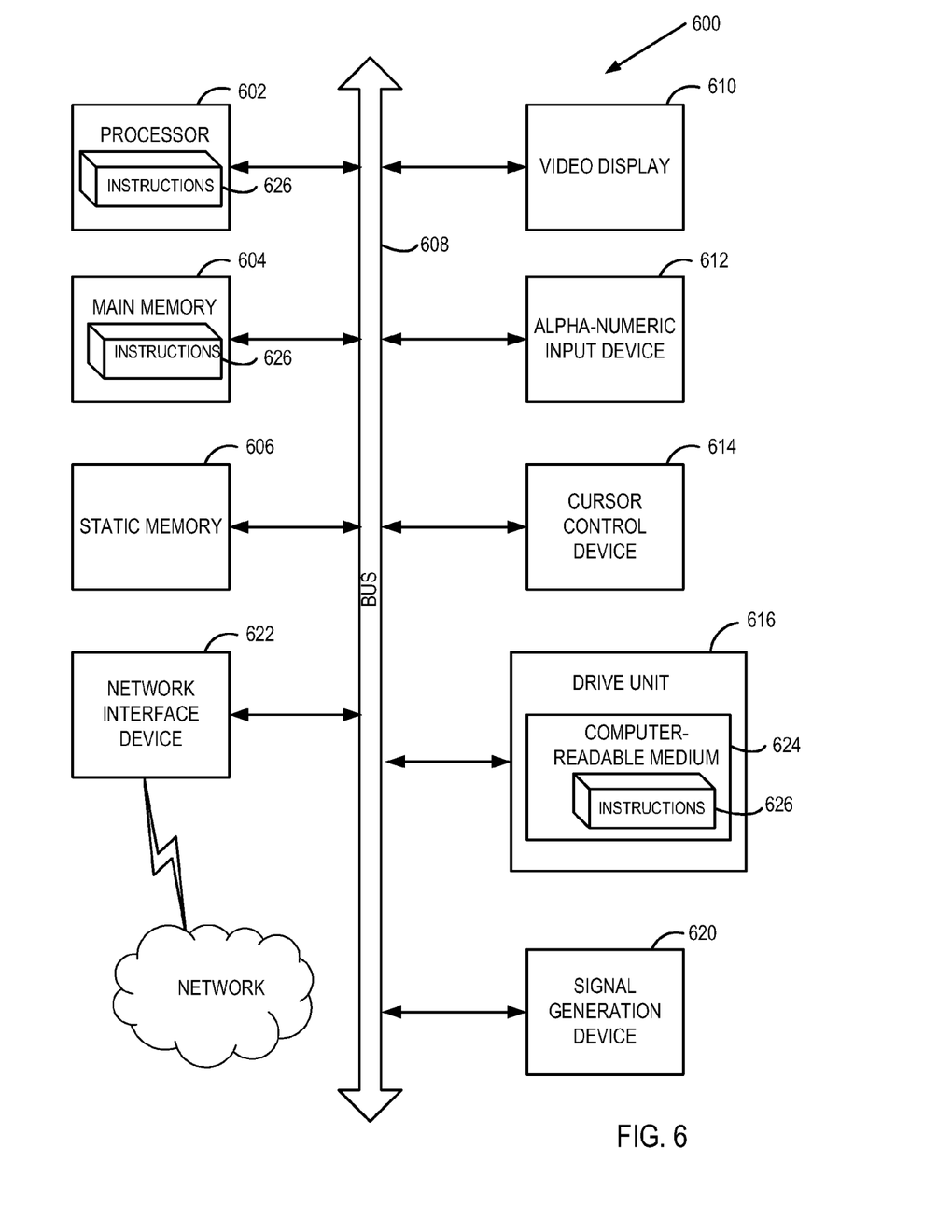
FIG. 6 depicts a block diagram of an illustrative computer system operating in accordance with aspects and implementations of the present disclosure.

FIG. 6 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by video collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "obtaining," "matching," "transmitting," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
   receiving, by a computer system, a first video stream;
   determining that the first video stream comprises a second video stream within a region of the first video stream using metadata identifying a set of geometric properties of the region;
   obtaining, by the computer system, the second video stream from the first video stream based on the set of geometric properties of the region; and
   determining, by the computer system, whether the second video stream contains copyrighted material.

2. The method of claim 1 wherein the region is a rectangle that is smaller than a full frame of the first video stream, and wherein the set of geometric properties comprises at least one of a coordinate or a dimension.

3. The method of claim 1 wherein the determining comprises:
   obtaining a fingerprint based on a segment of the second video stream; and
   matching the fingerprint against a repository of fingerprints of copyrighted video segments.

4. The method of claim 3 further comprising:
   identifying, based on the fingerprint, one or more copyrighted video segments that match the segment of the second video stream;
   determining, based on the one or more copyrighted video segments, one or more actions to perform; and
   performing the one or more actions.

5. The method of claim 4 wherein the one or more actions comprises removing the second video stream from the first video stream, and wherein the method further comprises transmitting, after the removing, the first video stream to one or more participants of a video collaboration session.

6. The method of claim 4 wherein the one or more actions comprises replacing, in the first video stream, the second video stream with video content that is not copyrighted, and wherein the method further comprises transmitting, after the replacing, the first video stream to one or more participants of a video collaboration session.

7. The method of claim 4 wherein the first video stream is associated with a video collaboration session, and wherein the one or more actions comprises terminating the video collaboration session.

8. The method of claim 1 wherein the first video stream is associated with a video collaboration session, and wherein the second video stream is broadcast by a participant of the video collaboration session.

9. The method of claim 8 wherein the metadata also identifies the participant.

10. An apparatus comprising:
a memory to store metadata pertaining to one or more video streams; and
a processor, couple to the memory, to:
identify a first video stream associated with a first participant of a video collaboration session and a second video stream associated with a second participant of the video collaboration session,
combine the first video stream and the second video stream into a third video stream, wherein the first video stream is embedded within a first region of the third video stream and the second video stream is embedded within a second region of the third video stream, and
insert into the third video stream metadata identifying a first set of geometric properties of the first region and a second set of geometric properties of the second region.

11. The apparatus of claim 10, further comprising a second processor to:
obtain from the third video stream, based on the metadata, the first video stream and the second video stream,
determine whether the first video stream contains copyrighted material, and
determine whether the second video stream contains copyrighted material.

12. The apparatus of claim 11 wherein the determining whether the first video stream contains copyrighted material comprises:
obtaining a fingerprint based on a segment of the first video stream; and
matching the fingerprint against a repository of fingerprints of copyrighted video segments.

13. The apparatus of claim 12 wherein the second computer system is further to:
identify, based on the fingerprint, one or more copyrighted video segments that match the segment of the first video stream;
determine, based on the one or more copyrighted video segments, one or more actions to perform; and
perform the one or more actions.

14. The apparatus of claim 13 wherein the one or more actions comprises replacing, in the third video stream, the first video stream with a static image.

15. The apparatus of claim 13 wherein the third video stream is associated with a video collaboration session, and wherein the first video stream is broadcast by a first participant of the video collaboration session, and wherein the second video stream is broadcast by a second participant of the video collaboration session, and wherein the one or more actions comprises transmitting to the first participant a warning that indicates that the first video stream contains copyrighted material.

16. The apparatus of claim 10 wherein the first region and second region are rectangles that are smaller than a full frame of the third video stream, and wherein the first set of geometric properties comprises at least one of a coordinate or a dimension of the first region, and wherein the second set of geometric properties comprises at least one of a coordinate or a dimension of the second region.

17. The apparatus of claim 16 wherein the metadata also identifies the first participant and the second participant.

18. The apparatus of claim 10 wherein the first computer system inserts the metadata into the third video stream at a plurality of points in time.

19. A non-transitory computer-readable storage medium, having instructions stored therein, which when executed, cause a computer system to perform operations comprising:
identifying, by the computer system, a first video stream that comprises:
a second video stream within a region of the first video stream, and
metadata identifying a set of geometric properties of the region;
obtaining, by the computer system, the second video stream from the first video stream based on the set of geometric properties of the region; and
identifying, by the computer system, a copyrighted video segment that matches the second video stream.

20. The non-transitory computer-readable storage medium of claim 19 wherein the region is a rectangle that is smaller than a full frame of the first video stream, and wherein the set of geometric properties comprises a dimension of the rectangle.

21. The non-transitory computer-readable storage medium of claim 19 wherein the identifying of the copyrighted video segment is based on a fingerprint of a segment of the second video stream.

22. The non-transitory computer-readable storage medium of claim 19 wherein the operations further comprise:
generating, by the computer system, the first video stream; and
inserting, by the computer system, the metadata into the first video stream.

23. The non-transitory computer-readable storage medium of claim 22 wherein the metadata is inserted into the first video stream at a plurality of points in time.

24. The non-transitory computer-readable storage medium of claim 19 wherein the operations further comprise:
determining, based on the copyrighted video segment, an action to perform; and
performing the action.

25. The non-transitory computer-readable storage medium of claim 24 wherein the action is to remove the second video stream from the first video stream.

26. The non-transitory computer-readable storage medium of claim 24 wherein the action is to replace, in the first video stream, the second video stream with a blank image.

* * * * *